(12) United States Patent
Kelly

(10) Patent No.: US 11,915,060 B2
(45) Date of Patent: Feb. 27, 2024

(54) GRAPHICS PROCESSING MANAGEMENT SYSTEM

(71) Applicant: Dell Products L.P., Round Rock, TX (US)

(72) Inventor: John Kelly, Mallow (IE)

(73) Assignee: Dell Products L.P., Round Rock, TX (US)

( * ) Notice: Subject to any disclaimer, the term of this patent is extended or adjusted under 35 U.S.C. 154(b) by 411 days.

(21) Appl. No.: 17/211,995

(22) Filed: Mar. 25, 2021

(65) Prior Publication Data
US 2022/0308932 A1 Sep. 29, 2022

(51) Int. Cl.
*G06F 9/46* (2006.01)
*G06F 9/50* (2006.01)
*G06F 9/455* (2018.01)
*G06T 1/20* (2006.01)
*G06F 9/48* (2006.01)

(52) U.S. Cl.
CPC ........ *G06F 9/5077* (2013.01); *G06F 9/45558* (2013.01); *G06F 9/4856* (2013.01); *G06T 1/20* (2013.01); *G06F 2009/45591* (2013.01)

(58) Field of Classification Search
CPC ................................................. G06F 9/45558
USPC ........................................................ 718/104
See application file for complete search history.

(56) References Cited

U.S. PATENT DOCUMENTS

| | | | | |
|---|---|---|---|---|
| 8,922,566 | B2* | 12/2014 | Soma | G06F 13/385 345/530 |
| 9,069,622 | B2* | 6/2015 | Post | G06F 9/5088 |
| 2007/0266391 | A1* | 11/2007 | Hoffman | G06F 11/3419 718/106 |
| 2014/0181807 | A1* | 6/2014 | Fonseca | G06F 9/5083 718/1 |
| 2016/0299773 | A1* | 10/2016 | Dong | G06F 9/45558 |
| 2017/0293994 | A1* | 10/2017 | Li | G06F 9/5083 |
| 2018/0295216 | A1* | 10/2018 | Kelly | H04L 69/165 |
| 2019/0139185 | A1* | 5/2019 | Baggerman | G06T 1/20 |
| 2019/0325554 | A1* | 10/2019 | Kelly | H04N 13/351 |
| 2019/0355088 | A1* | 11/2019 | Kurtz | G09G 5/006 |
| 2020/0142753 | A1* | 5/2020 | Harwood | G06F 9/52 |
| 2020/0233690 | A1* | 7/2020 | Bhatnagar | H04L 67/1004 |
| 2020/0387393 | A1* | 12/2020 | Xu | G06F 9/45558 |
| 2021/0011764 | A1* | 1/2021 | Kelly | G06F 9/505 |

(Continued)

*Primary Examiner* — Mehran Kamran
(74) *Attorney, Agent, or Firm* — Joseph Mencher

(57) ABSTRACT

A graphics processing management system includes a virtual machine coupled to client devices and a graphics processing system including graphics processing device(s). A graphics processing management subsystem is coupled to the virtual machine system and the client devices, and operates to monitor a usage of the graphics processing device(s) via the virtual machine system by a first client device. The graphics processing management subsystem then uses a graphics processing usage class equation to determine that feature(s) of the usage of the graphics processing device(s) by the first client device identifies a first graphics processing usage class. Based on determining that the usage of the graphics processing device(s) by the first client device identifies the first graphics processing usage class, the graphics processing management subsystem then performs a usage action with the first user that is associated with the first client device.

17 Claims, 10 Drawing Sheets

(56) References Cited

U.S. PATENT DOCUMENTS

2022/0308932 A1* 9/2022 Kelly .................. G06F 9/45533
2023/0048098 A1* 2/2023 Lam ........................ G10L 25/27

* cited by examiner

GRAPHICS PROCESSING MANAGEMENT SYSTEM

BACKGROUND

The present disclosure relates generally to information handling systems, and more particularly to the management of graphics processing resources included in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, hyper-converged systems, and/or other computing devices known in the art, are sometimes provided in datacenters and have their resources shared by one or more users of the datacenter. For example, computing devices in datacenters may include Graphics Processing Units (GPUs) that may be shared by users of that datacenter, and one of skill in the art in possession of the present disclosure will appreciate how such GPUs may provide superior performance relative to Central Processing Units (CPUs) with regard to the performance of graphics operations (e.g., accelerated graphics and/or other relatively high graphics processing activities known in the art) and compute operations (e.g., accelerated computing utilized in Artificial Intelligence (AI) operations, Machine Learning (ML) operations, Deep Learning (DL) operations, and/or other relatively high compute processing activities known in the art).

Many GPUs available in computing devices in a datacenter will be configured to perform both graphics operations and compute operations, either because those GPUs are not configurable to perform either one or the other, or because those GPUs have been specifically configured to perform both. The utilization of GPUs in a datacenter that are configured to perform both graphics operations and compute operations can raise some issues, particularly with regard to billing users of the datacenter for the use of those GPUs. Conventionally, the use of graphics processing resources and compute processing resources of GPUs is subject to different billing rates, but users of GPUs in the datacenter that are configured to perform both graphics operations and compute operations are typically billed for the use of both their graphics processing resources and compute processing resources even if their actual usage does not correspond to that billed usage. As such, users may be subject to billing for GPU functionality that they are not using, or the datacenter operator may provide GPU functionality to users that they are not paying for.

Accordingly, it would be desirable to provide a graphics processing management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a graphics processing usage management engine that is configured to: monitor a first usage of at least one graphics processing device via a virtual machine system by a first client device; determine, using a graphics processing usage class equation, that at least one first feature of the first usage of the at least one graphics processing device by the first client device identifies a first graphics processing usage class; and perform, based on determining that the first usage of the at least one graphics processing device by the first client device identifies the first graphics processing usage class, a first usage action with the first user that is associated with the first client device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
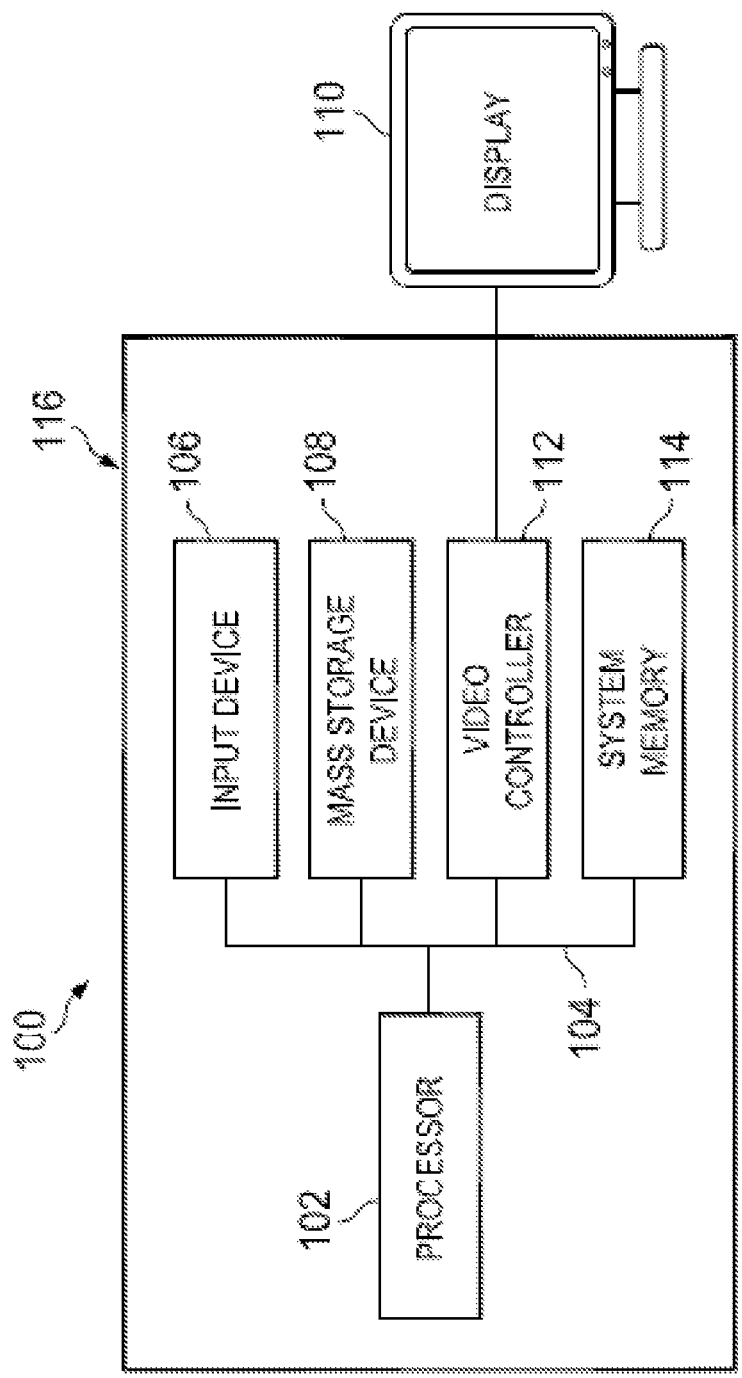
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
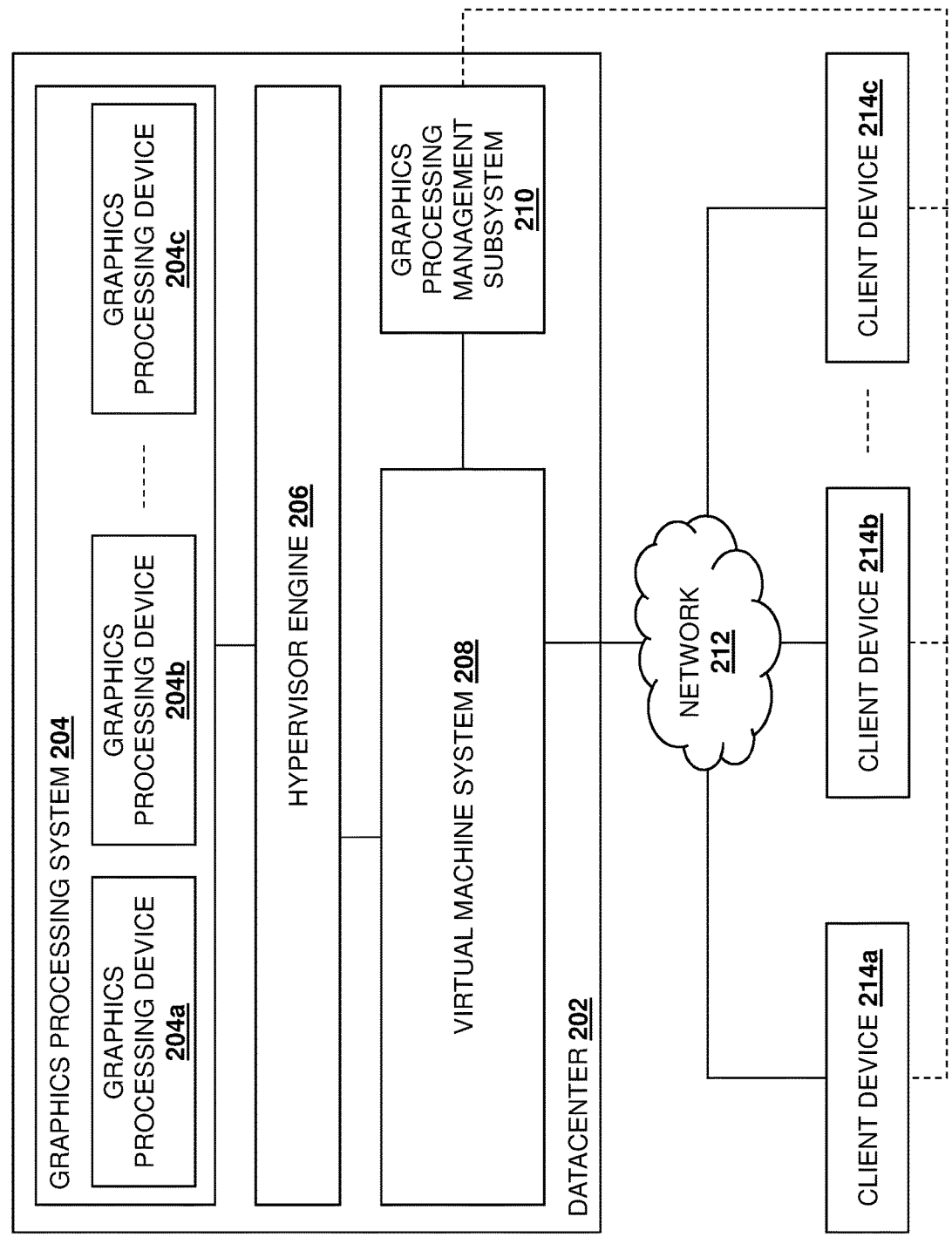
FIG. 2 is a schematic view illustrating an embodiment of a networked system that may utilize the graphics processing management system of the present disclosure.

Referring now to FIG. 2, an embodiment of a networked system 200 is illustrated. In the illustrated embodiment, the networked system 200 includes a datacenter 202. However, while the graphics processing management system of the present disclosure is described as being provided in a datacenter, one of skill in the art in possession of the present disclosure will appreciate that the graphics processing management system of the present disclosure may be implemented in a variety of other manners that will fall within the scope of present disclosure as well. The datacenter 202 includes shared resources that, in the examples provided herein, include a graphics processing system 204 having a plurality of graphics processing devices 204a, 204b, and up to 204c, each of which are described below as Graphics Processing Unit (GPU) devices. However, one of skill in the art in possession of the present disclosure will appreciate that other shared resources may benefit from the teachings provided herein, and thus those shared resources will fall within the scope of the present disclosure as well. In different embodiments, the graphics processing system 204 may be provided by one or more server devices (e.g., graphics processing devices 204a-204c/GPUs included in one or more server devices), one or more hyper-converged systems (e.g., graphics processing devices 204a-204c/GPUs included in one or more hyper-converged systems), stand-alone graphics processing devices/GPUs (e.g., in a graphics processing device/GPU rack), and/or in any other manner that one of skill in the art in possession of the present disclosure would recognize as providing the shared graphics processing system 204 discussed below.

In the illustrated embodiment, the datacenter 202 also includes a hypervisor processing system (not illustrated, but which may include the processor 102 discussed above with reference to FIG. 1) and a hypervisor memory system (not illustrated, but which may include the memory 114 discussed above with reference to FIG. 1) that is coupled to the hypervisor processing system and that includes instructions that, when executed by the hypervisor processing system, cause the hypervisor processing system to provide a hypervisor engine 206 that is coupled to the graphics processing system 204 and graphics processing devices 204a-204c, and that is configured to perform the functionality of the hypervisor engines discussed below. The datacenter 202 also includes a virtual machine system 208 that is coupled to the hypervisor engine 206, that may be provided by the IHS 100 discussed above with reference to FIG. 1 and/or may include some or all of the components of the IHS 100, and in specific examples may be provided by one or more server devices including server resources (e.g., Central Processing Units (CPUs), memory devices, storage devices, networking devices, and/or other server components known in the art) that are utilized (along with the graphics processing devices 204a-204c/graphics processing system 204 provided by those server device(s)) by the hypervisor engine 206 to provide one or more virtual machines. However, while illustrated and discussed as being provided by resources in server devices, one of skill in the art in possession of the present disclosure will recognize that the virtual machine system 208 may be provided in the networked system 200 using resources from a variety of devices while remaining within the scope of the present disclosure as well.

The datacenter 202 also includes a graphics processing management subsystem 210 that is coupled to the virtual machine system 208. In an embodiment, the graphics processing management subsystem 210 may be provided by the IHS 100 discussed above with reference to FIG. 1 and/or may include some or all of the components of the IHS 100, and in specific examples may be provided by one or more server devices. However, while described as being provided by one or more server devices, one of skill in the art in possession of the present disclosure will recognize that the functionality of the graphics processing management subsystem 210 may be provided by a variety of devices that are configured to operate similarly to the graphics processing management subsystem 210 discussed below. As illustrated, a network 212 is coupled to the datacenter 202, and may be provided by a Local Area Network (LAN), the Internet, combinations thereof, and/or other networks that would be apparent to one of skill in the art in possession of the present disclosure.

Furthermore, a plurality of client devices 214a, 214b, and up to 214c are coupled to the network 212. In an embodiment, any or all of the client devices 214a-214c may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, and/or any other computing devices/user devices that would be apparent to one of skill in the art in possession of the present disclosure as being utilized by the users discussed below to perform workloads using graphics processing resources. The graphics processing management subsystem 210 may be coupled to each of the client devices 214a-214b, which illustrated by dashed line in FIG. 2, but which one of skill in the art in possession of the present disclosure will recognize may be provided via the network 212. However, while a specific networked system 200 has been illustrated and described, one of skill in the art in possession of the present disclosure will recognize that the graphics processing management system of the present disclosure may include a variety of components and component configurations while remaining within the scope of the present disclosure as well.

Figure 3:
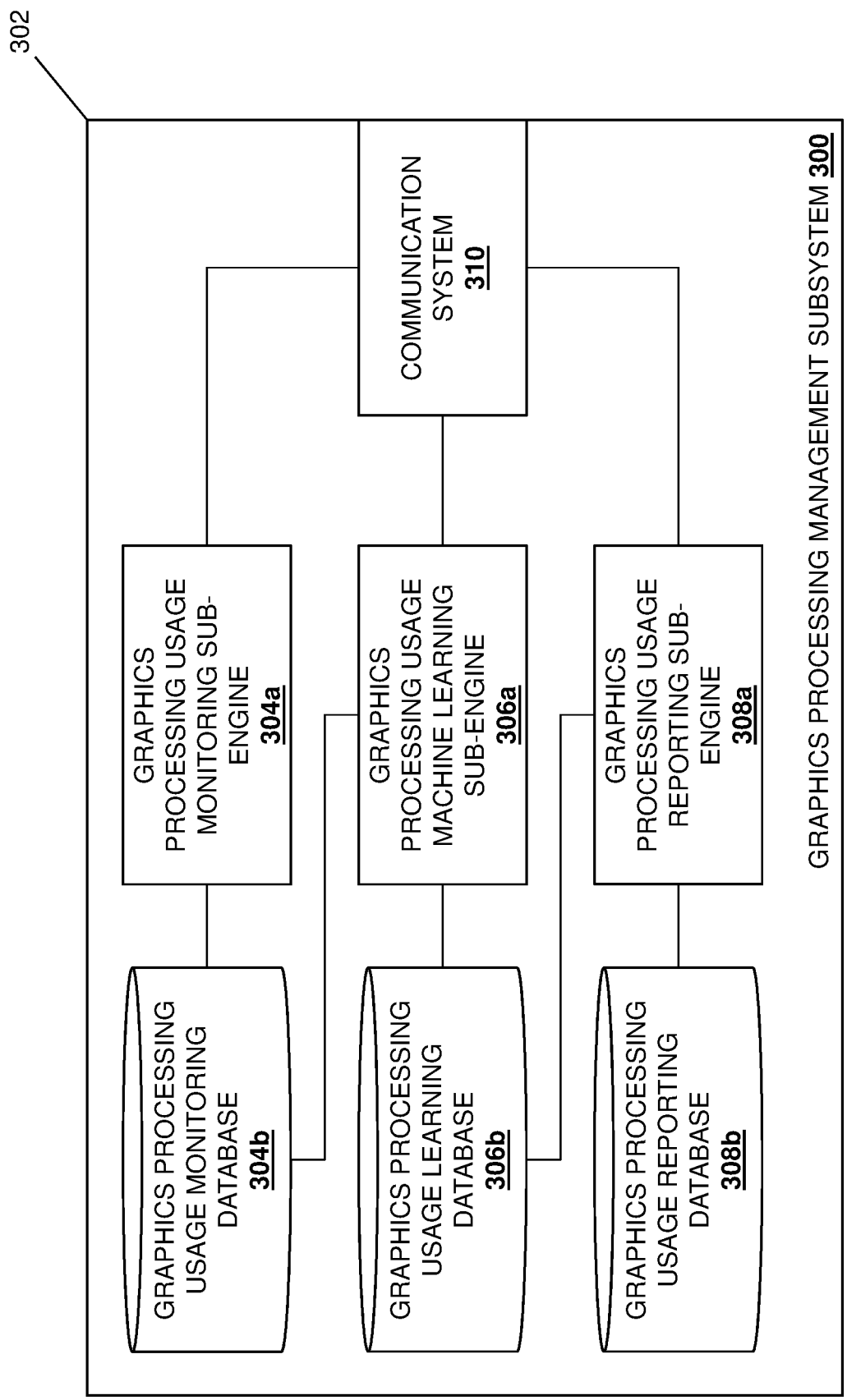
FIG. 3 is a schematic view illustrating an embodiment of a graphics processing management subsystem that is included in the networked system of FIG. 2.

Referring now to FIG. 3, an embodiment of a graphics processing management subsystem 300 is illustrated that may provide the graphics processing management subsystem 210 discussed above with reference to FIG. 2. As such, the graphics processing management subsystem 300 may be provided by the IHS 100 discussed above with reference to FIG. 1 and/or may include some or all of the components of the IHS 100, and in specific examples may be provided by one or more server devices. However, while illustrated and discussed as being provided by one or more server devices, one of skill in the art in possession of the present disclosure will recognize that the functionality of the graphics processing management subsystem 300 discussed below may be provided by other devices that are configured to operate similarly as the graphics processing management subsystem 300 discussed below. In the illustrated embodiment, the graphics processing management subsystem 300 includes a chassis 302 that may be included in the physical host device that provides the graphics processing management subsystem 300 and that houses the components used to provide the graphics processing management subsystem 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a graphics processing usage engine that is configured to perform the functionality of the graphics processing usage engines and/or graphics processing management subsystem 300 discussed below.

In the illustrated embodiment, the graphics processing usage engine includes a graphics processing usage monitoring sub-engine 304a that is configured to perform the monitoring operations discussed below, a graphics processing usage machine learning sub-engine 306a that is configured to perform the machine learning inference operations (and in some examples the machine learning training operations) discussed below, and a graphics processing usage reporting engine 308a that is configured to perform the reporting operations discussed below. However, while specific sub-engines that are configured to perform specific functionality are illustrated and described herein, one of skill in the art in possession of the present disclosure will appreciate that the graphics processing usage engine may be configured in other manners in order to perform the functionality below while remaining within the scope of the present disclosure as well.

The chassis 302 may also house a storage system (not illustrated, but which may include the storage 108 discussed above with reference to FIG. 1) that is coupled to the graphics processing usage engine (e.g., via a coupling between the storage system and the processing system) and that includes a graphics processing usage database that is configured to store any of the information utilized by the graphics processing usage engine discussed below. In the illustrated embodiment, the graphics processing usage database includes a graphics processing usage monitoring database 304b that is coupled to each of the graphics processing usage monitoring sub-engine 304a and the graphics processing usage machine learning sub-engine 304b, and that is configured to store any of the information utilized by the graphics processing usage monitoring sub-engine 304a discussed below. The graphics processing usage database also includes a graphics processing usage machine learning database 306b that is coupled to each of the graphics processing usage machine learning sub-engine 304b and the graphics processing usage reporting sub-engine 308a, and that is configured to store any of the information utilized by the graphics processing usage machine learning sub-engine 306a discussed below. The graphics processing usage database also includes a graphics processing usage reporting database 308b that is configured to store any of the information utilized by the graphics processing usage reporting sub-engine 308a discussed below. However, while specific database that are configured to store particular information are illustrated and described herein, one of skill in the art in possession of the present disclosure will appreciate that the graphics processing usage database may be configured in other manners in order to perform the functionality below while remaining within the scope of the present disclosure as well.

The chassis 302 may also house a communication system 310 that is coupled to the graphics processing usage engine (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that one of skill in the art in possession of the present disclosure would recognize that providing the couplings with the components of the networked system 200. However, while a specific graphics processing management subsystem 300 has been illustrated and described, one of skill in the art in possession of the present disclosure will recognize that the graphics processing management subsystem (or other devices operating according to the teachings of the present disclosure in a manner similar to that described below for the graphics processing management subsystem 300) may include a variety of components and/or component configurations for providing conventional graphics processing management functionality, as well as the functionality discussed below, while remaining within the scope of the present disclosure as well.

Figure 4:
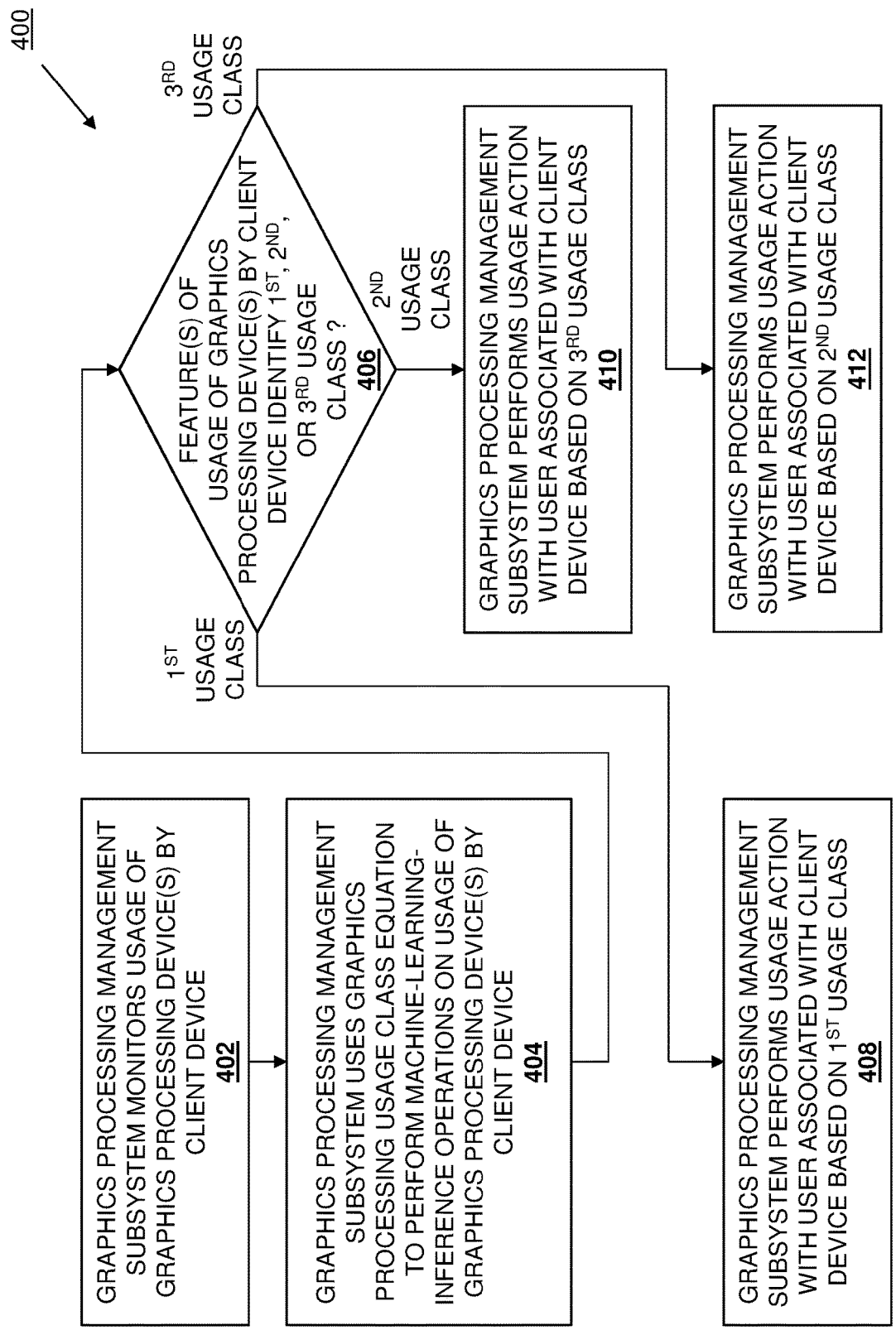
FIG. 4 is a flow chart illustrating an embodiment of a method for managing graphics processing resources.

Referring now to FIG. 4, an embodiment of a method 400 for managing graphics processing resources is illustrated. As discussed below, embodiments of the systems and methods of the present disclosure provide for the use of a graphics processing usage class equation that was generated using machine learning training to perform machine-learning inference operations that identify a usage class of usage of graphics processing device(s) by a client device, which allows for performance of usage actions such as usage billing or workload migration based on that usage class. For example, the graphics processing management system of the present disclosure may include a virtual machine coupled to client devices and a graphics processing system including graphics processing device(s). A graphics processing management subsystem is coupled to the virtual machine system and the client devices, and operates to monitor a usage of the graphics processing device(s) via the virtual machine system by a first client device. The graphics processing management subsystem then uses a graphics processing usage class equation to determine that feature(s) of the usage of the graphics processing device(s) by the first client device identifies a first graphics processing usage class. Based on determining that the usage of the graphics processing device(s) by the first client device identifies the first graphics processing usage class, the graphics processing management subsystem then performs a usage action with the first user that is associated with the first client device. As such, usage actions such as usage billing may be performed based on the usage of graphics processing operations and/or compute processing operations performed by graphics processing devices, providing increased accuracy in the billing of users for GPU functionality that they are actually using, and reducing the amount of GPU functionality provided by datacenter operators to users that they are not paying for.

Figure 5:
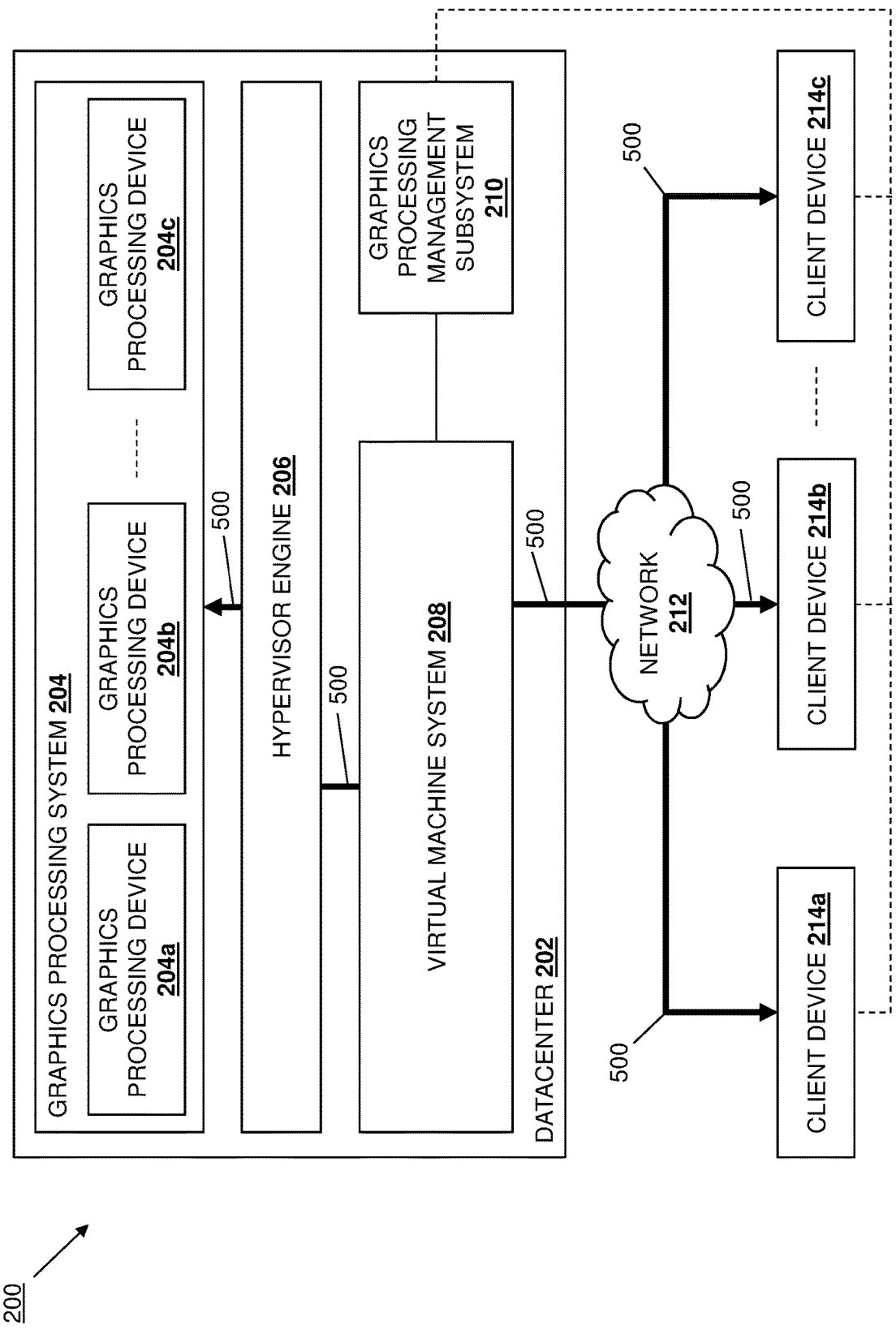
FIG. 5 is a schematic view illustrating an embodiment of the networked system of FIG. 2 operating according to the method of FIG. 4.

The method 400 begins at block 402 where a graphics processing management subsystem monitors usage of graphics processing device(s) by a client device. With reference to FIG. 5, in an embodiment of block 402, each of the client devices 214a, 214b, and up to 214c may perform graphics processing device usage operations 500 that may include transmitting and receiving commands, instructions, requests, and/or other data communications via the network 212 and to the virtual machine system 208 in the datacenter 208, with the virtual machine system 208 transmitting and receiving commands, instructions, requested, and/or other data communications via the hypervisor engine 206 with one or more of the graphics processing devices 204a, 204b, and up to 204c in the graphics processing system 204. As will be appreciated by one of skill in the art in possession of the present disclosure, the hypervisor engine 206 may perform virtualization operations using resources included in server devices such as, for example, the graphics processing devices 204a, 204b, and up to 204c, CPUs, memory devices, storage devices, networking devices, and/or any other hardware components that one of skill in the art in possession of the present disclosure would appreciate as providing the provisioning of virtual machines, virtual desktops, and/or any other virtualized systems known in the art.

As such, the graphics processing devices 204a, 204b, and up to 204c, CPUs, memory devices, storage devices, networking devices, and/or any other hardware components in those server devices may be virtualized, allowing one or more client devices to utilize any portion of the available resources in those server devices (e.g., any of the graphics processing devices 204a-204a may be utilized entirely by a client device, or shared by client devices). In the examples below, the graphics processing device usage operations 500 performed by the client device 214a provide a "graphics usage" that includes the client device 214a utilizing the virtual machine system 208 (e.g., a virtual desktop provided in the virtual machine system 208 in the examples below) in a manner that requires the performance of primarily graphics processing operations (e.g., graphics acceleration operations) by the graphics processing devices 204a, 204b, and/or 204c, and one of skill in the art in possession of the present disclosure will appreciate how that utilization of the virtual machine system 208 will also include the utilization of other resources included in the server devices that are used to provide the virtual machine system 208. Similarly, the graphics processing device usage operations 500 performed by the client device 214b in the examples below provide a "compute usage" that includes the client device 214b utilizing the virtual machine system 208 (e.g., a virtual machine provided in the virtual machine system 208 in the examples below) in a manner that requires the performance of primarily compute processing operations (e.g., Artificial Intelligence (AI) processing operations, Machine Learning (ML) processing, or Deep Learning (DL) processing operations) by the graphics processing devices 204a, 204b, and/or 204c, and one of skill in the art in possession of the present disclosure will appreciate how that utilization of the virtual machine system 208 will also include the utilization of other resources included in the server devices that are used to provide the virtual machine system 208.

Similarly as well, the graphics processing device usage operations 500 performed by the client device 214c in the examples below provide a "mixed graphics/compute usage" that includes the client device 214c utilizing the virtual machine system 208 (e.g., a virtual desktop and/or virtual machine provided in the virtual machine system 208 in the examples below) in a manner that requires the performance of both graphics processing operations and compute processing operations by the graphics processing devices 204a, 204b, and/or 204c, and one of skill in the art in possession of the present disclosure will appreciate how that utilization of the virtual machine system 208 will also include the utilization of other resources included in the server devices that are used to provide the virtual machine system 208. However, while particular types of usage of the graphics processing devices 204a-204c and virtual machine system 208 are described, one of skill in the art in possession of the present disclosure will appreciate that other types of usages of the graphics processing devices 204a-204c and virtual machine system 208 may be defined and monitored at block 402 while remaining within the scope of the present disclosure.

In a specific example, the virtualization operations using the resources in the datacenter 202 may enable the provisioning of "as a Service" (aaS) uses of the datacenter 202, with the ability to provide any portion of the datacenter resources "on-demand/aaS" and with the ability to scale resources up and down as desired, even within particular components such as the graphics processing devices 204a-204c. Furthermore, the different graphics, compute, and mixed graphics/compute use cases for the graphics processing devices 204a-204c may be associated with different billing rates, and may require different server resources (e.g., CPUs, memory devices, storage devices, networking devices, etc.) in order to provide for the most efficient provisioning of any particular workload provided in that use case. In a specific example, a billing rate for the graphics usage discussed above may be $70/month, a billing rate for the compute usage discussed above may be $60/month, a billing rate for the mixed graphics/compute usage discussed above may be $100/month and, as such, it is in the interests of the datacenter administrator to identify the usages of the graphics processing system 204 in order to accurately bill users of the clients devices 214a-214c. However, while specific monthly billing rates have been provided, one of skill in the art in possession of the present disclosure will appreciate that any billing techniques for graphics processing resources (e.g., a billing rate applied to usage details such as processing time utilized) will fall within the scope of the present disclosure.

Figure 6A:
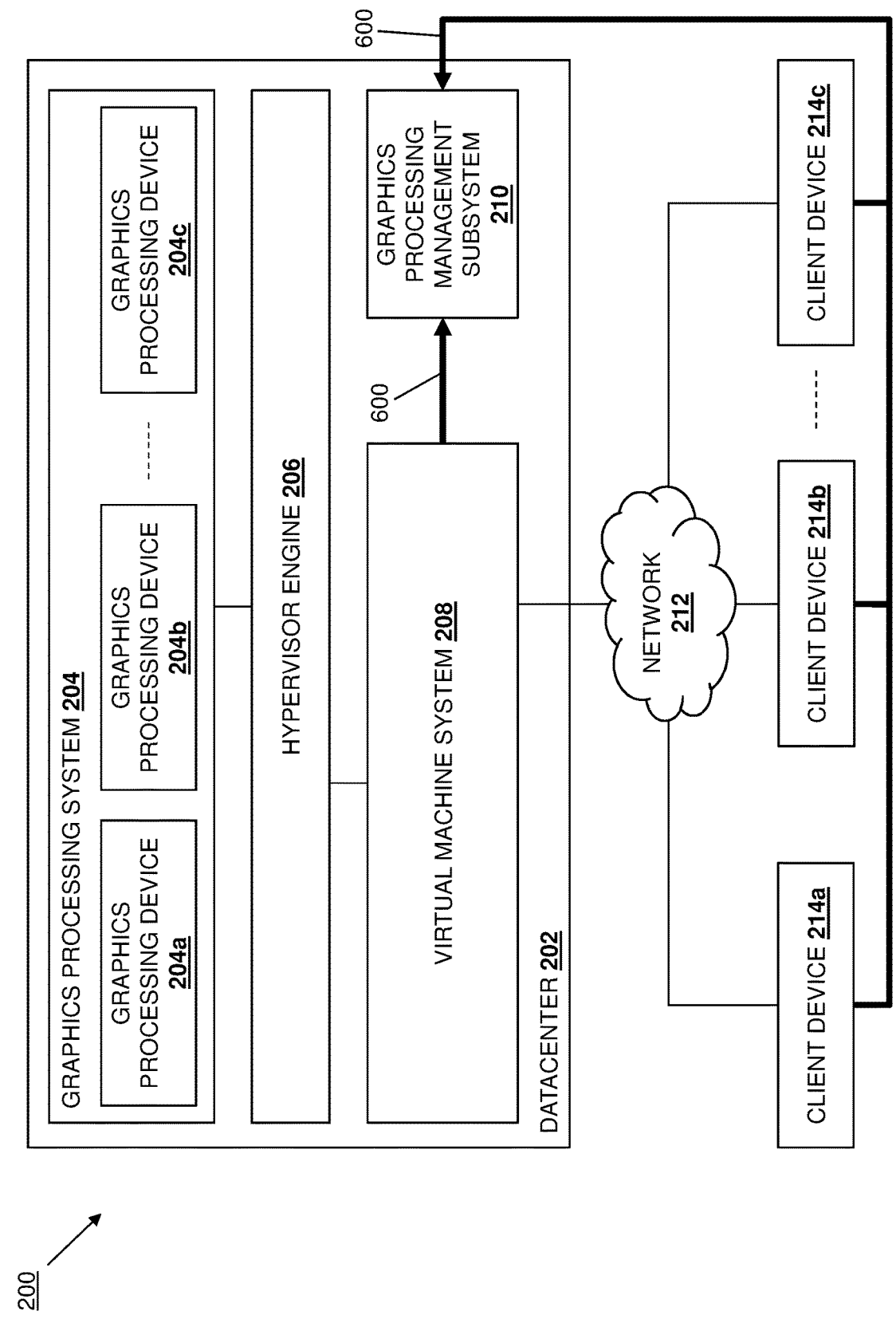
FIG. 6A is a schematic view illustrating an embodiment of the networked system of FIG. 2 operating according to the method of FIG. 4.
Figure 6B:
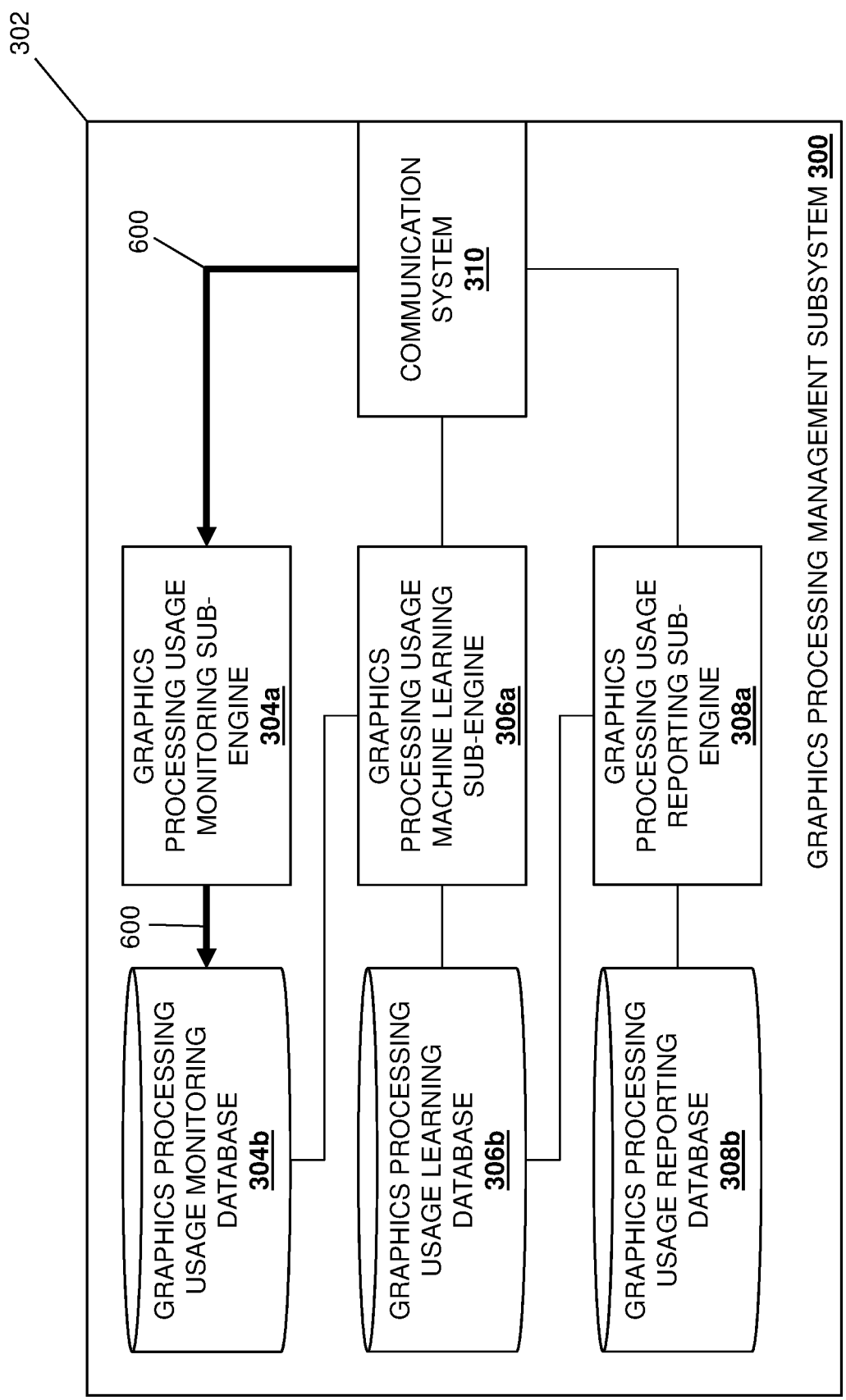
FIG. 6B is a schematic view illustrating an embodiment of the graphics processing management subsystem of FIG. 3 operating according to the method of FIG. 4.

With reference to FIGS. 6A and 6B, at block 602, the graphics processing usage monitoring sub-engine 304a in the graphics processing management subsystem 210/300 may perform graphics processing device usage monitoring operations 600 that include monitoring, via its communication system 310, operations of the virtual machine system 308 and/or operations of the client devices 214a, 214b, and 214c that are performed during the graphics processing device usage operations 500 by the client devices 214a, 214b, and 214c. In an embodiment, the operations of the virtual machine system 308 and/or the operations of the client devices 214a, 214b, and 214c that are performed during the graphics processing device usage operations 500 by the client devices 214a, 214b, and 214c and that are monitored by the graphics processing usage monitoring sub-engine 304a at block 602 may include monitoring and identifying a number of display devices included in the client devices 214a-214c, monitoring and identifying a screen resolution of at least one display device included in the client devices 214a-214c, monitoring and identifying a display protocol utilized by the client devices 214a-214c, monitoring and identifying a frame rate utilized by at least one display device included in the client devices 214a-214c, monitoring and identifying a number of graphics Application Programming Interface (API) calls (e.g., DIRECTX® graphics API calls, Open Graphics Library (OpenGL) graphics API calls, VULKAN® graphics API calls, etc.) transmitted by the client devices 214a-214c, monitoring and identifying a number of compute API calls (e.g., Open Compute Language (OpenCL) compute API calls, Compute Unified Device Architecture (CUDA) compute API calls, etc.) transmitted by the client devices 214a-214c, and/or monitoring and identifying any other usage feature that one of skill in the art in possession of the present disclosure would recognize an being indicative of a type of usage (e.g., the graphics usage, compute usage, or mixed graphics/compute usage discussed above) of the graphics processing devices 204a-204c. As illustrated in FIG. 6B, the graphics processing device usage monitoring operations 600 may also include the graphics processing usage monitoring sub-engine 304a storing any identified usage features in its graphics processing usage monitoring database 304b.

The method 400 then proceeds to block 404 where the graphics processing management subsystem uses a graphics processing usage class equation to perform machine-learning-inference operations on the usage of the graphics processing device(s) by the client device. In some embodiments, prior to the method 400, machine-learning-training techniques may be utilized to generate a graphics processing usage class equation for use in performing machine-learning-inference operations at block 404. In a specific example, a standard logistic regression approach for multi-class classification may be utilized, and the three usage classes discussed above may be defined as a graphics usage class, a compute usage class, and mixed graphics/compute usage class. For example, the graphics usage class may be defined as usage that includes the graphics processing device(s) performing more than a threshold amount of graphics processing operations and/or utilizing more than a threshold amount of graphics processing resources. Similarly, the compute usage class may be defined as usage that includes the graphics processing device(s) performing more than a threshold amount of compute processing operations and/or utilizing more than a threshold amount of compute processing resources. Furthermore, the mixed graphics/compute usage class may be defined as usage that includes the graphics processing device(s) performing graphics processing operations and/or utilizing graphics processing resources within a threshold graphics processing range, as well as performing compute processing operations and/or utilizing compute processing resources within a threshold compute processing range. However, while specific examples of definitions of different usage classes are provided above, one of skill in the art in possession of the present disclosure will appreciate that usage classes may be defined in any manner while remaining within the scope of the present disclosure as well.

As will be appreciated by one of skill in the art in possession of the present disclosure, the machine-learning-training techniques may include defining input variables as the usage features described above that are indicative of usage classes. As such, the input variables/usage features may include a number of display devices included in a client device (e.g., with more display devices indicative of relatively higher levels of graphics usage, and fewer display devices indicative of relatively lower levels of graphics usage and possibly higher levels of compute usage), a screen resolution of at least one display device included in a client device (e.g., with higher screen resolution indicative of relatively higher levels of graphics usage, and lower screen resolution indicative of relatively lower levels of graphics usage and possibly higher levels of compute usage), a display protocol utilized by a client device (e.g., with particular display protocols indicative of relatively higher levels of graphics usage, and particular display protocols indicative of relatively lower levels of graphics usage and possibly higher levels of compute usage), a frame rate utilized by at least one display device included in a client device (e.g., with higher frame rates indicative of relatively higher levels of graphics usage, and lower frame rates indicative of relatively lower levels of graphics usage and possibly higher levels of compute usage), a number of graphics API calls transmitted by a client device (e.g., with more graphics API calls indicative of relatively higher levels of graphics usage, and fewer graphics API calls indicative of relatively lower levels of graphics usage and possibly higher levels of compute usage), a number of compute API calls transmitted by a client device (e.g., with more compute API calls indicative of relatively higher levels of compute usage, and fewer compute API calls indicative of relatively lower levels of graphics usage and possibly higher levels of grahpics usage), and/or any other usage feature that one of skill in the art in possession of the present disclosure would recognize an being indicative of the usage of graphics processing devices.

As will also be appreciated by one of skill in the art in possession of the present disclosure, the machine-learning-training techniques may also include training a logistic regression classifier $h_\theta^{(i)}(x)$ for each usage class i in order to predict the probability that y=i. In specific examples, a gradient descent algorithm may be utilized to perform the training discussed above, although the use of other training algorithms will fall within the scope of the present disclosure as well. As such, the machine-learning-training may be performed with the usage features discussed above to determine the values of parameters based on those usage features that are the best fit for a graphics processing usage class equation, which may include utilizing usage data sets that each identify particular usage features (e.g., a particular number of display devices, a particular screen resolution, a particular display protocol, a particular frame rate, a particular number of graphics API calls, and a particular number of compute API calls) and fall into particular usage classes (e.g., the graphics usage class, the compute usage class, the mixed graphics/compute usage class) in order to generate the graphics processing usage class equation that includes coefficient(s) that may be continuously developed with further usage data sets, and with that graphics processing usage class equation used in the machine-learning-inference operations below to infer which usage class a new usage data set falls into.

In some embodiments, the machine-learning-training may include a machine-learning-training user manually classifying usage data sets in particular usage classes. Furthermore, in some embodiments, the machine-learning-training may also include classifying usage data sets based on those usage data sets having been generated via the use of graphics processing devices that are configured to only perform particular usage operations (e.g., usage data sets classified in the graphics usage class may be generated via the use of graphics processing devices that are configured to only perform graphics processing operations, usage data sets classified in the compute usage class may be generated via the use of graphics processing devices that are configured to only perform compute processing operations, etc.) However, while specific examples of the generation of the graphics processing usage class equation are provided, one of skill in the art in possession of the present disclosure will appreciate that the graphics processing usage class equation utilized in the machine-learning-inference operations discussed below may be generated in a variety of other manners that will fall within the scope of the present disclosure as well.

Figure 7:
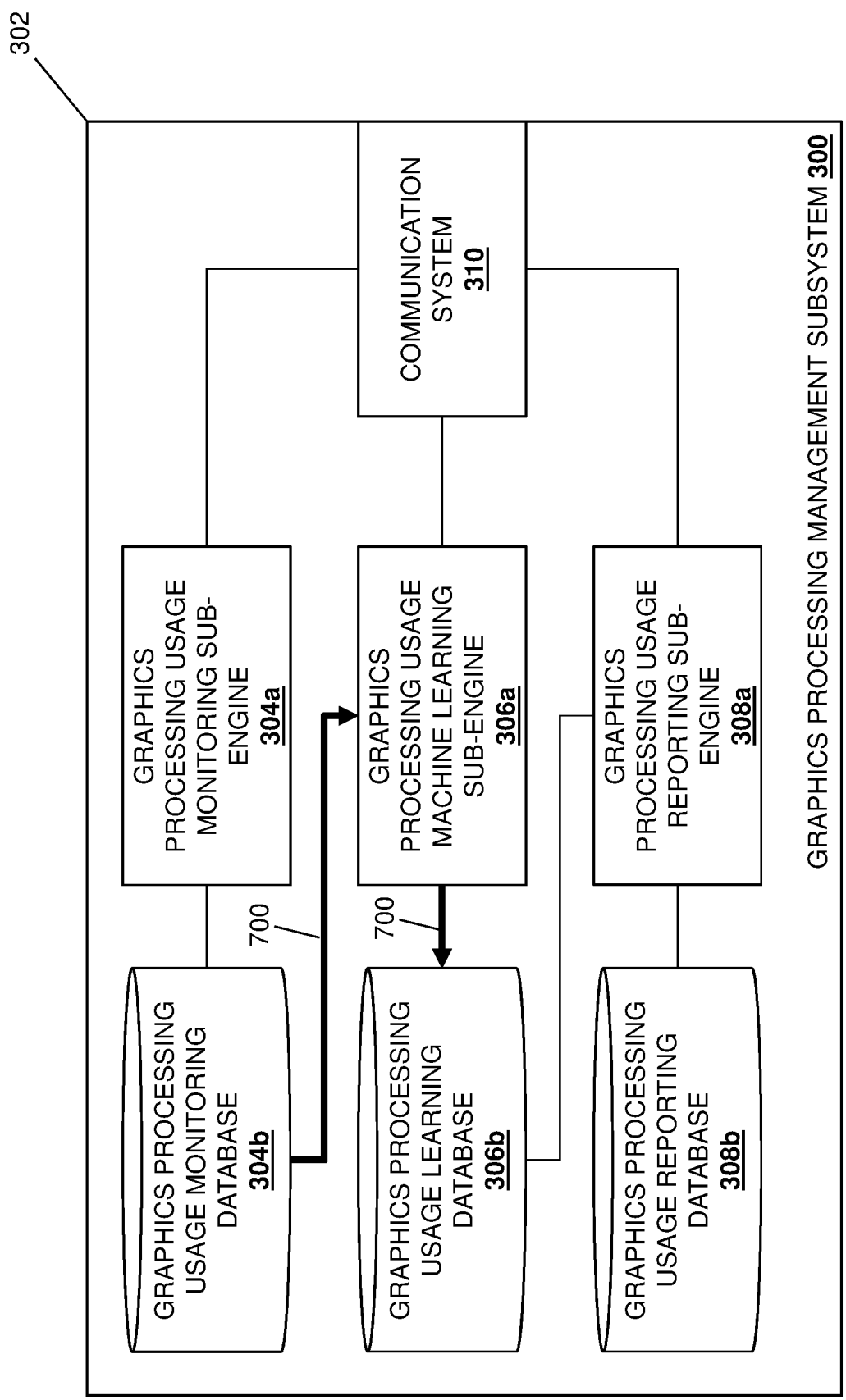
FIG. 7 is a schematic view illustrating an embodiment of the graphics processing management subsystem of FIG. 3 operating according to the method of FIG. 4.

Referring now to FIG. 7, in an embodiment of block 404, the graphics processing usage machine learning sub-engine 306a may perform machine-learning-inference operations 700 that include retrieving identified usage features that were stored in the graphics processing usage monitoring database 304b at block 402 for any particular usage or usages of the graphics processing device(s) 204a/204c by any of the client devices 214a-214c, and utilizing the graphics processing usage class equation discussed above with those usage features to perform machine-learning-inference operations. Continuing with the example provided above in which a logistic regression classifier $h_\theta^{(i)}(x)$ was trained for each usage class i in order to allow for the prediction of the probability that y=i, one of skill in the art in possession of the present disclosure will appreciate that for any new input x (i.e., any identified usage features for usage(s) by a particular client device), a usage class i may be identified that maximizes the logistic regression classifier $h_\theta^{(i)}(x)$. As such, for the usage features identified for the usage(s) by any particular client device 214a-214c, the machine-learning-inference operations performed by the graphics processing usage machine learning sub-engine 306a may utilze those usage features with the graphics processing usage class equation in order to identify a particular usage class that was used to generate and train the graphics processing usage class equation.

The method 400 then proceeds to decision block 406 where it is determined whether feature(s) of the usage of the graphics processing device(s) by the client device identify a first, second, or third usage class. Continuing with the example of the three usage classes above, in an embodiment of decision block 406 and based on the usage features identified for the usage(s) by any particular client device 214a-214c, the machine-learning-inference operations performed by the graphics processing usage machine learning sub-engine 306a may identify the graphics usage class, the compute usage class, or the mixed graphics/compute usage class. Furthermore, one of skill in the art in possession of the present disclosure will appreciate how repeated performance of the method 400 allows for the classification of new data sets that may provide for continuous training of the graphics processing usage class equation, thus making subsequent usage class identifications for any particular usage(s) via the graphics processing usage class equation more accurate. With reference back to FIG. 7, at decision block 406 and as part of the machine-learning-inference operations 700, the graphics processing usage machine learning sub-engine 306a may store the usage class identification determined at decision block 406 (and in some cases, usage details) in the graphics processing usage learning database 306b.

Figure 8A:
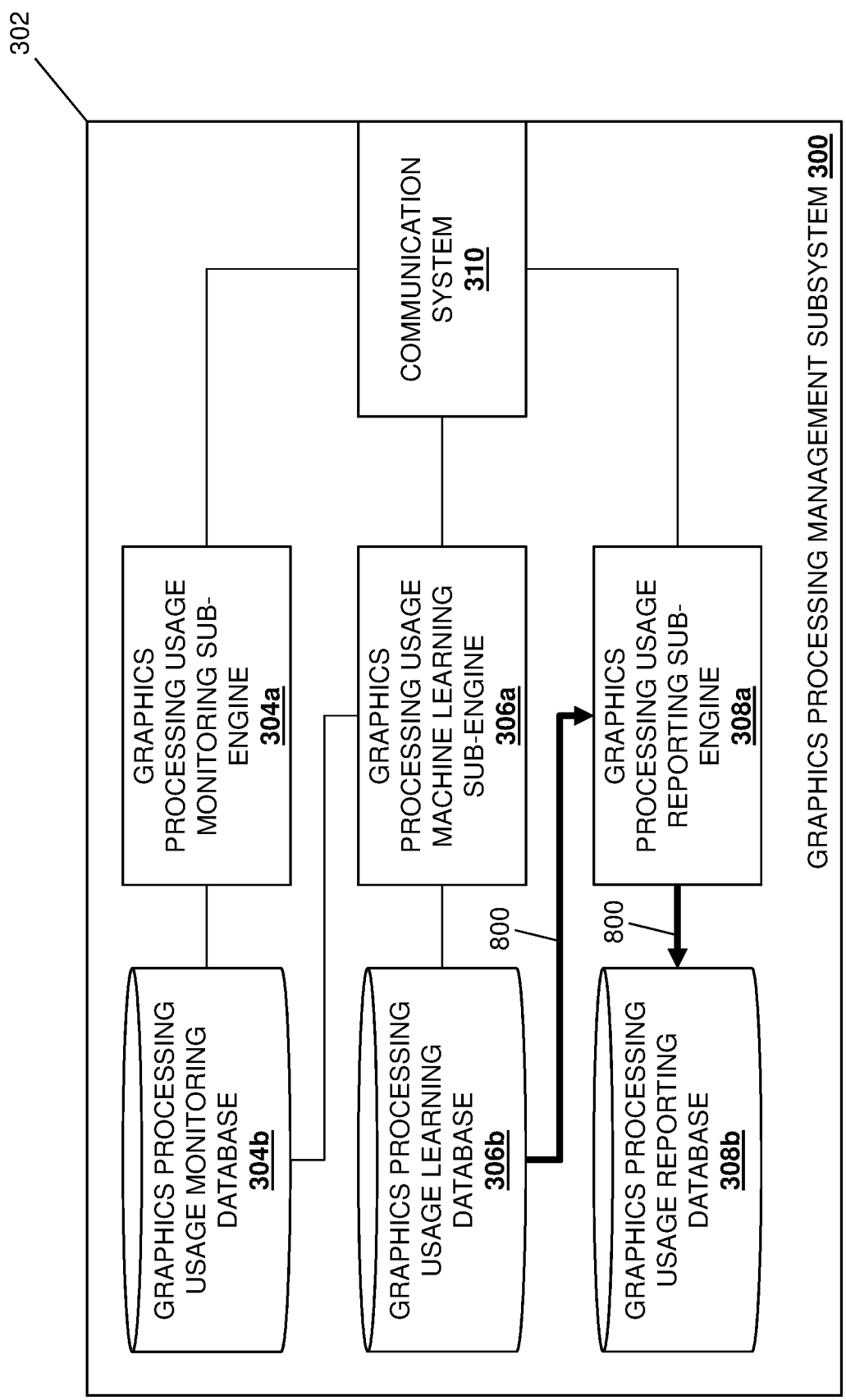
FIG. 8A is a schematic view illustrating an embodiment of the graphics processing management subsystem of FIG. 3 operating according to the method of FIG. 4.
Figure 8B:
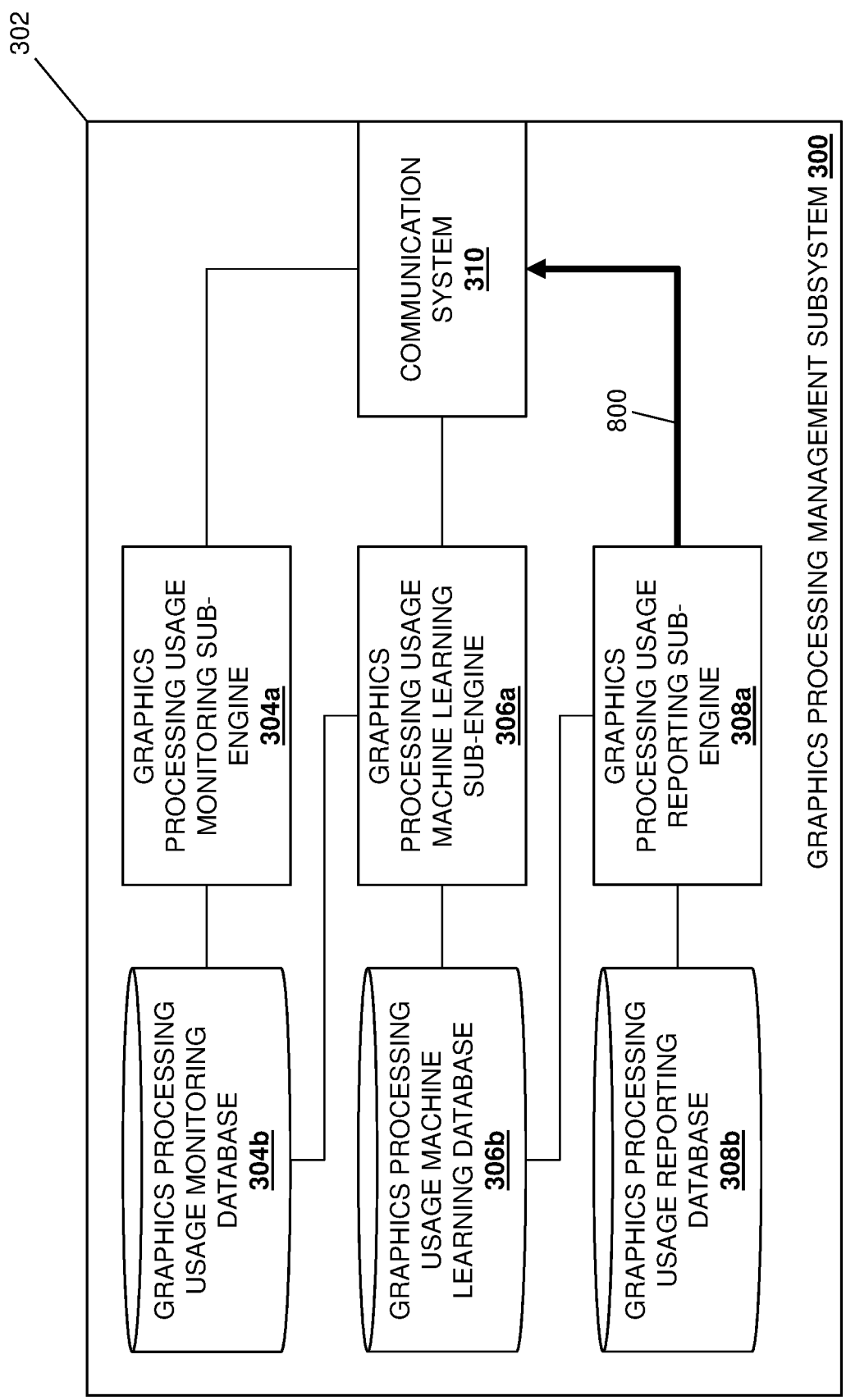
FIG. 8B is a schematic view illustrating an embodiment of the graphics processing management subsystem of FIG. 3 operating according to the method of FIG. 4.

If, at decision block 406, it is determined that the feature(s) of the usage of the graphics processing device(s) by the client device identify a first usage class, the method 400 proceeds to block 408 where the graphics processing management subsystem performs a usage action with a user associated with the client device based on the first usage class. With reference to FIG. 8A, in an embodiment of block 408, the graphics processing usage reporting sub-engine 308a may perform usage action operations 800 that may include identifying a usage class identification (and in some cases, usage details) for a client device in the graphics processing usage learning database 306b, identifying a user associated with that client device/usage class identification (and in some cases, usage details) in the graphics processing usage reporting database 308b, and performing a usage action associated with that user based on the usage class identification. Continuing with the example above in which the client device 214a provides a "graphics usage" that includes the client device 214a utilizing the virtual machine system 208 (e.g., a virtual desktop provided in the virtual machine system 208 in the examples below) in a manner that requires the performance of primarily graphics processing operations by the graphics processing devices 204a, 204b, and/or 204c, the usage class identification may identify a graphics usage class, and at block 408 the usage action performed by the graphics processing usage reporting sub-engine 308a may include generating a usage bill using a first billing rate that is based on the graphics usage class and, in some examples, the usage details. As illustrated in FIG. 8B, the usage action operations 800 may include the graphics processing usage reporting sub-engine 308a providing the usage bill via is communication system 310 to the user associated with the client device 214a.

In another example in which the client device 214a provides a "graphics usage" that includes the client device 214a utilizing the virtual machine system 208 (e.g., a virtual desktop provided in the virtual machine system 208 in the examples below) in a manner that requires the performance of primarily graphics processing operations by the graphics processing devices 204a, 204b, and/or 204c, the usage class identification may identify a graphics usage class, and at block 408 the usage action performed by the graphics processing usage reporting sub-engine 308a may include migrating at least one workload being performed by the client device 214a from at least one first server subsystem (e.g., the CPUs, memory devices, storage devices, or networking devices discussed above) to at least one second server subsystem based on the graphics intensive use of the graphics processing devices 204a, 204b, and/or 204c by the client device 214a. As such, workloads provided by client devices that include graphics intensive uses of the graphics processing devices 204a, 204b, and/or 204c may be migrated between server subsystems in order to provide for more efficient performance of those workloads.

If, at decision block 406, it is determined that the feature(s) of the usage of the graphics processing device(s) by the client device identify a second usage class, the method 400 proceeds to block 410 where the graphics processing management subsystem performs a usage action with a user associated with the client device based on the second usage class. Continuing with the example above in which the client device 214b provides a "compute usage" that includes the client device 214b utilizing the virtual machine system 208 (e.g., a virtual desktop provided in the virtual machine system 208 in the examples below) in a manner that requires the performance of primarily compute processing operations by the graphics processing devices 204a, 204b, and/or 204c, the usage class identification may identify a compute usage class, and at block 408 the usage action performed by the graphics processing usage reporting sub-engine 308a as part of the usage action operations 800 may include generating a usage bill using a second billing rate that is based on the compute usage class and, in some examples, the usage details. The usage action operations 800 may also include the graphics processing usage reporting sub-engine 308a providing the usage bill via is communication system 310 to the user associated with the client device 214b.

In another example in which the client device 214b provides a "compute usage" that includes the client device 214b utilizing the virtual machine system 208 (e.g., a virtual desktop provided in the virtual machine system 208 in the examples below) in a manner that requires the performance of primarily compute processing operations by the graphics processing devices 204a, 204b, and/or 204c, the usage class identification may identify a compute usage class, and at block 408 the usage action performed by the graphics processing usage reporting sub-engine 308a may include migrating at least one workload being performed by the client device 214b from at least one first server subsystem (e.g., the CPUs, memory devices, storage devices, or networking devices discussed above) to at least one second server subsystem based on the compute intensive use of the graphics processing devices 204a, 204b, and/or 204c by the client device 214b. As such, workloads provided by client devices that include compute intensive uses of the graphics processing devices 204a, 204b, and/or 204c may be migrated between server subsystems in order to provide for more efficient performance of those workloads.

If, at decision block 406, it is determined that the feature(s) of the usage of the graphics processing device(s) by the client device identify a third usage class, the method 400 proceeds to block 412 where the graphics processing management subsystem performs a usage action with a user associated with the client device based on the third usage class. Continuing with the example above in which the client device 214c provides a "mixed graphics/compute usage" that includes the client device 214c utilizing the virtual machine system 208 (e.g., a virtual desktop provided in the virtual machine system 208 in the examples below) in a manner that requires the performance of both graphics processing operations and compute processing operations by the graphics processing devices 204a, 204b, and/or 204c, the usage class identification may identify a mixed graphics/compute usage class, and at block 408 the usage action performed by the graphics processing usage reporting sub-engine 308a as part of the usage action operations 800 may include generating a usage bill using a third billing rate that is based on the mixed graphics/compute usage class and, in some examples, the usage details. The usage action operations 800 may also include the graphics processing usage reporting sub-engine 308a providing the usage bill via is communication system 310 to the user associated with the client device 214c.

In another example in which the client device 214c provides a "mixed graphics/compute usage" that includes the client device 214c utilizing the virtual machine system 208 (e.g., a virtual desktop provided in the virtual machine system 208 in the examples below) in a manner that requires the performance of both graphics processing operations and compute processing operations by the graphics processing devices 204a, 204b, and/or 204c, the usage class identification may identify a mixed graphics/compute usage class, and at block 408 the usage action performed by the graphics processing usage reporting sub-engine 308a may include migrating at least one workload being performed by the client device 214c from at least one first server subsystem (e.g., the CPUs, memory devices, storage devices, or networking devices discussed above) to at least one second server subsystem based on the mixed graphics/compute use of the graphics processing devices 204a, 204b, and/or 204c by the client device 214c. As such, workloads provided by client devices that include mixed graphics/compute uses of the graphics processing devices 204a, 204b, and/or 204c may be migrated between server subsystems in order to provide for more efficient performance of those workloads Thus, systems and methods have been described that provide for the use of a graphics processing usage class equation to perform machine-learning inference operations that identify a usage class of usage of graphics processing device(s) by a client device, which allows for performance of usage actions such as usage billing or workload migration based on that usage class. For example, the graphics processing management system of the present disclosure may include a virtual machine coupled to client devices and a graphics processing system including graphics processing device(s). A graphics processing management subsystem is coupled to the virtual machine system and the client devices, and operates to monitor a usage of the graphics processing device(s) via the virtual machine system by a first client device. The graphics processing management subsystem then uses a graphics processing usage class equation to determine that feature(s) of the usage of the graphics processing device(s) by the first client device identifies a first graphics processing usage class. Based on determining that the usage of the graphics processing device(s) by the first client device identifies the first graphics processing usage class, the graphics processing management subsystem then performs a usage action with the first user that is associated with the first client device. As such, usage actions such as usage billing may be performed based on the usage of graphics processing operations and/or compute processing operations performed by graphics processing devices, providing increased accuracy in the billing of users for GPU functionality that they are actually using, and reducing the GPU functionality provided by datacenter operators to users that they are not paying for.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A graphics processing management system, comprising:
   a graphics processing system including at least one graphics processing device;
   a virtual machine system that is coupled to the graphics processing system;

a plurality of client devices that are coupled to the virtual machine system; and a graphics processing management subsystem that is coupled to the virtual machine system and the plurality of client devices, wherein the graphics processing management system is configured to:

monitor a first usage of the at least one graphics processing device via the virtual machine system by a first client device that is included in the plurality of client devices;

determine, using a graphics processing usage class equation, that at least one first feature of the first usage of the at least one graphics processing device by the first client device identifies a graphics usage class that is associated with graphics processing operations performed by the at least one graphics processing device;

generate, using a first billing rate that is based on the graphics usage class, a first usage bill and providing the first usage bill to a first user that is associated with the first client device;

monitor a second usage of the at least one graphics processing device via the virtual machine system by a second client device that is included in the plurality of client devices;

determine, using the graphics processing usage class equation, that at least one second feature of the second usage of the at least one graphics processing device by the second client device identifies a compute usage class that is associated with compute processing operations performed by the at least one graphics processing device; and generate, using a second billing rate that is based on the compute usage class, a second usage bill and providing the second usage bill to a second user that is associated with the second client device.

2. The system of claim 1, wherein the graphics processing management system is configured to:

monitor a third usage of the at least one graphics processing device via the virtual machine system by a third client device that is included in the plurality of client devices;

determine, using the graphics processing usage class equation, that at least one third feature of the third usage of the at least one graphics processing device by the second client device identifies a mixed graphics/compute usage class that is associated with graphics processing operations performed by the at least one graphics processing device within a mixed graphics processing operation range and compute processing operations performed by the at least one graphics processing device within a mixed compute processing operation range; and perform, based on determining that the third usage of the at least one graphics processing device by the third client device identifies the mixed graphics/compute usage class, a third usage action with a third user that is associated with the third client device.

3. The system of claim 1, wherein the graphics usage class is associated with a utilization of more than a threshold amount of graphics processing resources of the at least one graphics processing device, and wherein the compute usage class is associated with a utilization of more than a threshold amount of compute processing resources of the at least one graphics processing device.

4. The system of claim 1, wherein the performing the first usage action based on determining that the first usage of the at least one graphics processing device by the first client device identifies the graphics usage class includes:

migrating, based on the graphics usage class, at least one workload being performed by the first client device from at least one first computing subsystem to at least one second computing subsystem, and wherein the performing the second usage action based on determining that the second usage of the at least one graphics processing device by the second client device identifies the compute usage class includes:

migrating, based on the compute usage class, at least one workload being performed by the second client device from at least one third computing subsystem to at least one fourth computing subsystem.

5. The system of claim 1, wherein the at least one first feature of the first usage of the at least one graphics processing device by the first client device includes at least one of:

a number of display devices included in the first client device;

a screen resolution of at least one display device included in the first client device;

a display protocol utilized by the first client device;

a frame rate utilized by at least one display device included in the first client device;

a number of graphics Application Programming Interface (API) calls transmitted by the first client device; or a number of compute API calls transmitted by the first client device, and wherein the at least one second feature of the second usage of the at least one graphics processing device by the second client device includes at least one of:

a number of display devices included in the second client device;

a screen resolution of at least one display device included in the second client device;

a display protocol utilized by the second client device;

a frame rate utilized by at least one display device included in the second client device;

a number of graphics API calls transmitted by the second client device.

6. An Information Handling System (IHS), comprising:

a processing system; and a memory system that is coupled to the processing system and that includes instructions that, when executed by the processing system, cause the processing system to provide a graphics processing usage management engine that is configured to:

monitor a first usage of at least one graphics processing device via a virtual machine system by a first client device;

determine, using a graphics processing usage class equation, that at least one first feature of the first usage of the at least one graphics processing device by the first client device identifies a graphics usage class that is associated with graphics processing operations performed by the at least on graphics processing device;

generate, using a first billing rate that is based on the graphics usage class, a first usage bill and providing the first usage bill to a first user that is associated with the first client device;

monitor a second usage of the at least one graphics processing device via the virtual machine system by a second client device;

determine, using the graphics processing usage class equation, that at least one second feature of the second usage of the at least one graphics processing device by the second client device identifies a compute usage class that is associated with compute processing operations performed by the at least one graphics processing device; and generate, using a second billing rate that is based on the compute usage class, a second usage bill and providing the second usage bill to a second user that is associated with the second client device.

7. The IHS of claim 6, wherein the graphics usage class is associated with a utilization of more than a threshold amount of graphics processing resources of the at least one graphics processing device, and wherein the compute usage class is associated with a utilization of more than a threshold amount of compute processing resources of the at least one graphics processing device.

8. The IHS of claim 6, wherein the graphics processing management engine is configured to:

monitor a third usage of the at least one graphics processing device via the virtual machine system by a third client device;

determine, using the graphics processing usage class equation, that at least one third feature of the third usage of the at least one graphics processing device by the third client device identifies a mixed graphics/compute usage class that is associated with graphics processing operations performed by the at least one graphics processing device within a mixed graphics processing operation range and compute processing operations performed by the at least one graphics processing device within a mixed compute processing operation range; and perform, based on determining that the third usage of the at least one graphics processing device by the third client device identifies the mixed graphics/compute usage class, a third usage action with a second third user that is associated with the third client device.

9. The IHS of claim 8, wherein the performing the third usage action based on determining that the third usage of the at least one graphics processing device by the third client device identifies the mixed graphics/compute usage class includes:

generating, using a third billing rate that is based on the mixed graphics/compute usage class, a third usage bill; and providing the third usage bill to the third user that is associated with the third client device.

10. The IHS of claim 6, wherein the performing the first usage action based on determining that the first usage of the at least one graphics processing device by the first client device identifies the first graphics processing usage class includes:

migrating, based on the first graphics processing usage class, at least one workload being performed by the first client device from at least one first computing subsystem to at least one second computing subsystem, and wherein the performing the second usage action based on determining that the second usage of the at least one graphics processing device by the second client device identifies the compute usage class includes:

migrating, based on the compute usage class, at least one workload being performed by the second client device from at least one third computing subsystem to at least one fourth computing subsystem.

11. The IHS of claim 6, wherein the at least one first feature of the first usage of the at least one graphics processing device by the first client device includes at least one of:

a number of display devices included in the first client device;

a screen resolution of at least one display device included in the first client device;

a display protocol utilized by the first client device;

a frame rate utilized by at least one display device included in the first client device;

a number of graphics Application Programming Interface (API) calls transmitted by the first client device; or a number of compute API calls transmitted by the first client device, and wherein the at least one second feature of the second usage of the at least one graphics processing device by the second client device includes at least one of:

a number of display devices included in the second client device;

a screen resolution of at least one display device included in the second client device;

a display protocol utilized by the second client device;

a frame rate utilized by at least one display device included in the second client device;

a number of graphics API calls transmitted by the second client device; or a number of compute API calls transmitted by the second client device.

12. A method for managing graphics processing resources, comprising:

monitoring, by a graphics processing management subsystem, a first usage of at least one graphics processing device via a virtual machine system by a first client device;

determining, by the graphics processing management subsystem using a graphics processing usage class equation, that at least one first feature of the first usage of the at least one graphics processing device by the first client device identifies a graphics usage class that is associated with graphics processing operations performed by the at least one graphics processing device;

generating, using a first billing rate that is based on the graphics usage class, a first usage bill and providing the first usage bill to a first user that is associated with the first client device;

monitoring, by the graphics processing management subsystem, a second usage of at least one graphics processing device via the virtual machine system by a second client device;

determining, by the graphics processing management subsystem using the graphics processing usage class equation, that at least one second feature of the second usage of the at least one graphics processing device by the second client device identifies a compute usage class that is associated with compute processing operations performed by the at least one graphics processing device; and generating, using a second billing rate that is based on the compute usage class, a second usage bill and providing the second usage bill to a second user that is associated with the second client device.

13. The method of claim 12, wherein the graphics usage class is associated with a utilization of more than a threshold amount of graphics processing resources of the at least one graphics processing device, and wherein the compute usage class is associated with a utilization of more than a threshold amount of compute processing resources of the at least one graphics processing device.

14. The method of claim 13, further comprising:
monitoring, by the graphics processing management subsystem, a third usage of the at least one graphics processing device via the virtual machine system by a third client device;
determining, by the graphics processing management subsystem using the graphics processing usage class equation, that at least one third feature of the third usage of the at least one graphics processing device by the third client device identifies a mixed graphics/compute usage class that is associated with graphics processing operations performed by the at least one graphics processing device within a mixed graphics processing operation range and compute processing operations performed by the at least one graphics processing device within a mixed compute processing operation range; and
performing, by the graphics processing management subsystem based on determining that the third usage of the at least one graphics processing device by the third client device identifies the mixed graphics/compute usage class, a third usage action with a third user that is associated with the third client device.

15. The method of claim 14, wherein the performing the third usage action based on determining that the third usage of the at least one graphics processing device by the third client device identifies the mixed graphics/compute usage class includes:
generating, using a third billing rate that is based on the mixed graphics/compute usage class, a third usage bill; and
providing the third usage bill to the third user that is associated with the third client device.

16. The method of claim 12, wherein the performing the first usage action based on determining that the first usage of the at least one graphics processing device by the first client device identifies the graphics usage class includes:
migrating, by the graphics processing management subsystem based on the graphics usage class, at least one workload being performed by the first client device from at least one first computing subsystem to at least one second computing sub system,
and wherein the performing the second usage action based on determining that the second usage of the at least one graphics processing device by the second client device identifies the compute usage class includes:
migrating, by the graphics processing management subsystem based on the compute usage class, at least one workload being performed by the second client device from at least one third computing subsystem to at least one fourth computing subsystem.

17. The method of claim 12, wherein the at least one first feature of the first usage of the at least one graphics processing device by the first client device includes at least one of:
a number of display devices included in the first client device;
a screen resolution of at least one display device included in the first client device;
a display protocol utilized by the first client device;
a frame rate utilized by at least one display device included in the first client device;
a number of graphics Application Programming Interface (API) calls transmitted by the first client device; or
a number of compute API calls transmitted by the first client device,
and wherein the at least one second feature of the second usage of the at least one graphics processing device by the second client device includes at least one of:
a number of display devices included in the second client device;
a screen resolution of at least one display device included in the second client device;
a display protocol utilized by the second client device;
a frame rate utilized by at least one display device included in the second client device;
a number of graphics API calls transmitted by the second client device; or
a number of compute API calls transmitted by the second client device.

* * * * *

UNITED STATES PATENT AND TRADEMARK OFFICE
CERTIFICATE OF CORRECTION

PATENT NO. : 11,915,060 B2
APPLICATION NO. : 17/211995
DATED : February 27, 2024
INVENTOR(S) : John Kelly It is certified that error appears in the above-identified patent and that said Letters Patent is hereby corrected as shown below:

In the Claims

Claim 8, Column 17, Lines 35-36, "a second third user" should read --a third user--;

Claim 16, Column 20, Line 2, "sub system" should read --subsystem--.

Signed and Sealed this
Sixteenth Day of April, 2024

Katherine Kelly Vidal
Director of the United States Patent and Trademark Office